United States Patent [19]

Zaber

[11] Patent Number: 5,050,533

[45] Date of Patent: * Sep. 24, 1991

[54] APPLICATION OF THERMAL-CURE MATERIALS

[75] Inventor: Robert J. Zaber, Detroit, Mich.

[73] Assignee: Technadyne Engineering Corporation, Detroit, Mich.

[ * ] Notice: The portion of the term of this patent subsequent to Jan. 2, 2007 has been disclaimed.

[21] Appl. No.: 603,121

[22] Filed: Oct. 25, 1990

Related U.S. Application Data

[62] Division of Ser. No. 375,122, Jul. 3, 1989, abandoned, which is a division of Ser. No. 223,630, Jul. 25, 1988, Pat. No. 4,890,573.

[51] Int. Cl.$^5$ ............................................. B05C 11/10
[52] U.S. Cl. ..................... 118/667; 118/410; 118/429; 392/481
[58] Field of Search ............... 118/415, 302, 410, 429, 118/666, 667; 165/30, 64; 392/481

[56] References Cited

U.S. PATENT DOCUMENTS

| 752,768 | 2/1904 | Goodwin | 118/667 |
|---|---|---|---|
| 2,530,799 | 11/1950 | Arvintz et al. | 219/326 |
| 3,323,578 | 6/1967 | Hermann | 165/30 |
| 3,690,292 | 9/1972 | Pasley, Sr. | 118/415 |
| 3,880,228 | 4/1975 | Houk et al. | 427/422 |
| 4,792,661 | 12/1988 | Schmidtchen et al. | 165/30 |
| 4,890,573 | 1/1990 | Zaber | 118/410 |

Primary Examiner—Richard V. Fisher
Assistant Examiner—Todd J. Burns
Attorney, Agent, or Firm—Barnes, Kisselle, Raisch, Choate, Whittemore & Hulbert

[57] ABSTRACT

A system for applying one-part thermal-cure material, such as structural epoxy, includes apparatus for heating or cooling the epoxy to a temperature above or below ambient. A spirally coiled tube is suspended within a hollow enclosure by tube end fittings extending from axially opposed ends of the tube. An electrical heater and temperature sensor extend from opposed enclosure ends into the tube coils approximately centrally of the enclosure. The enclosure is filled with a heat transfer fluid that surrounds the coiled tubing. The fluid is connected through an inlet and outlet in the enclosure endwalls for circulation externally of the enclosure through a fluid chiller. A microprocessor-based controller receives input signals from the temperature sensor and a temperature adjustment mechanism, and provides outputs to the heater, chiller and heater-exchange fluid pump and circulation valve, and to alarm mechanisms for indicating a high-temperature or low-temperature alarm condition.

11 Claims, 3 Drawing Sheets

APPLICATION OF THERMAL-CURE MATERIALS

This application is a division of co-pending application Ser. No. 07/375,122 filed July 3, 1989 now abandoned, which was division of application Ser. No. 07/223,630 filed July 25, 1988, now U.S. Pat. No. 4,890,573.

The present invention is directed to a system for applying or depositing one-part thermal-cure materials such as structural epoxy, and more particularly to a device for controllably heating or cooling the material to a preselected temperature above or below room temperature prior to material deposition.

It is a general object of the present invention to provide a material application system of the described character that includes a material heating and cooling device which obtains enhanced control of material temperature, and in which the material is thoroughly heated throughout its volume without internal temperature gradients or the like.

Another object of the present invention is to provide a material heating apparatus for use in such a system which is sufficiently small as to be mountable on a robot arm adjacent to the application nozzle, and which thereby obtains enhanced control of material temperature at the application nozzle without deleterious effects of heat loss or gain during passage through intermediate conduits.

A further object of the invention is to provide a material heating apparatus of the described character that is economical to assemble and reliable in operation over an extended lifetime.

The invention, together with additional objects, features and advantages thereof, will be best understood from the following description, the appended claims and the accompanying drawings in which:

Figure 1:
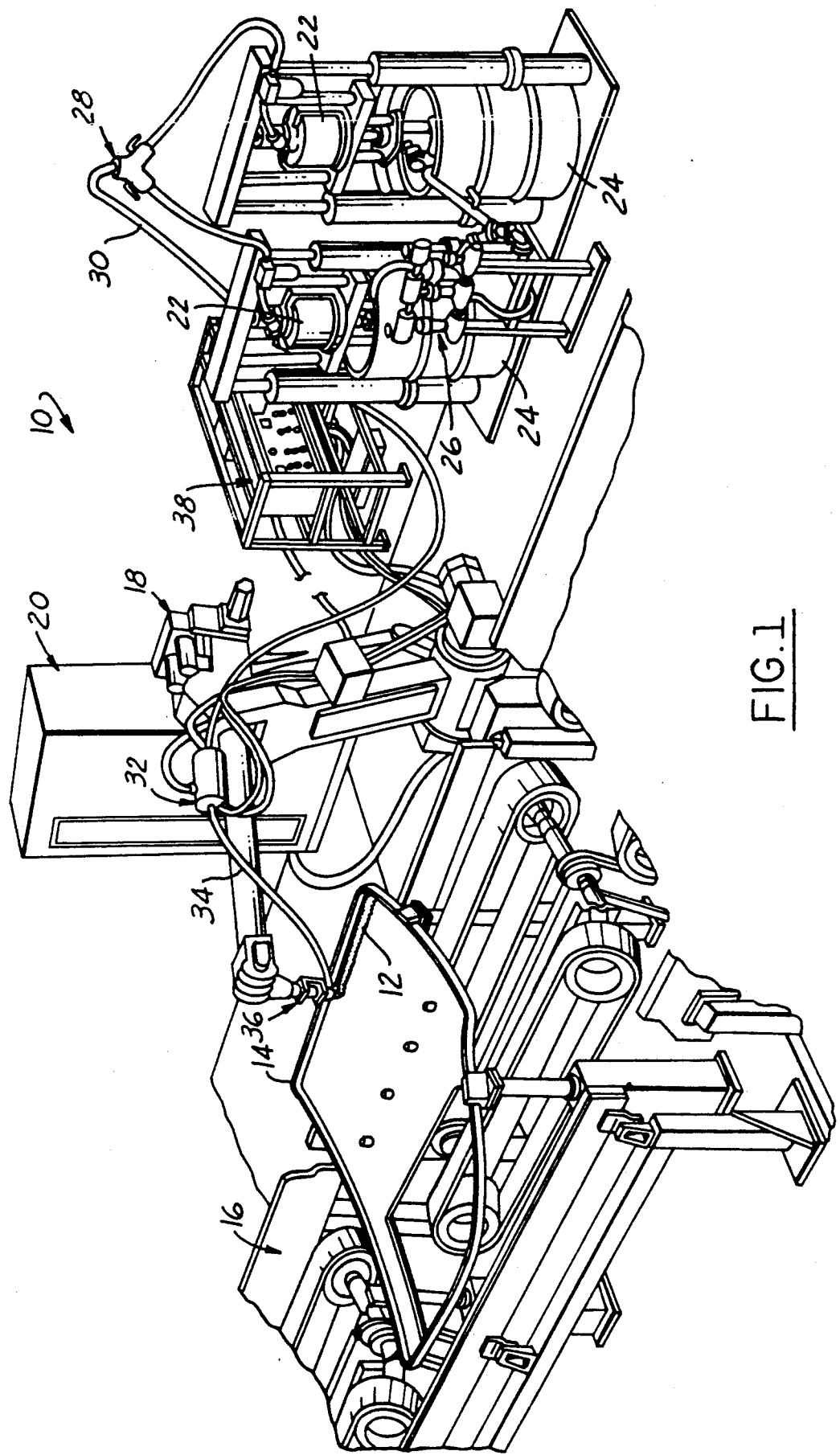
FIG. 1 is a fragmentary perspective view of a system for applying thermal-cure materials in an automated production process in accordance with a presently preferred embodiment of the invention.

FIG. 1 illustrates a system 10 for applying a bead 12 of structural epoxy to the interior surface of a multiplicity of door panels 14 passing in sequence along a conveyor 16. A robot arm 18 is positioned adjacent to conveyor 16 at the material application station, and is movable in multiple degrees of freedom under control of a robot controller 20. To the extent thus far described, line 10 illustrated in FIG. 1 is entirely exemplary of an environment in which a system in accordance with the present invention may be employed.

In accordance with the presently preferred embodiment of the invention, material to be deposited as bead 12 is applied by air-driven positive displacement high-volume high-pressure double-acting suction-assisted double elevator low-shear piston pumps 22 which draw material from respective drums 24. Valving 26, 28 is provided for allowing replacement of one material drum while operation continues at the other. Material is supplied under pressure from pumps 22 through conduit 30 to a material conditioning apparatus 32 for heating the material to an elevated temperature for deposition on panel 14, and then by a conduit or hose 34 to an extrusion nozzle 36. Nozzle 36 is carried at the end of robot arm 18, and in accordance with an important advantage of the present invention, material conditioner 32 is of sufficiently small size that it also may be carried on robot arm 18 adjacent to extrusion nozzle 36 for minimizing heat loss in material traveling from conditioner 32 through conduit 34 to nozzle 36. Material conditioner 32 is connected to a control package 38, which includes control electronics to be described in detail in connection with FIG. 2 and other suitable means for selectively-controlling temperature of material passing through conditioner 32.

Figure 2:
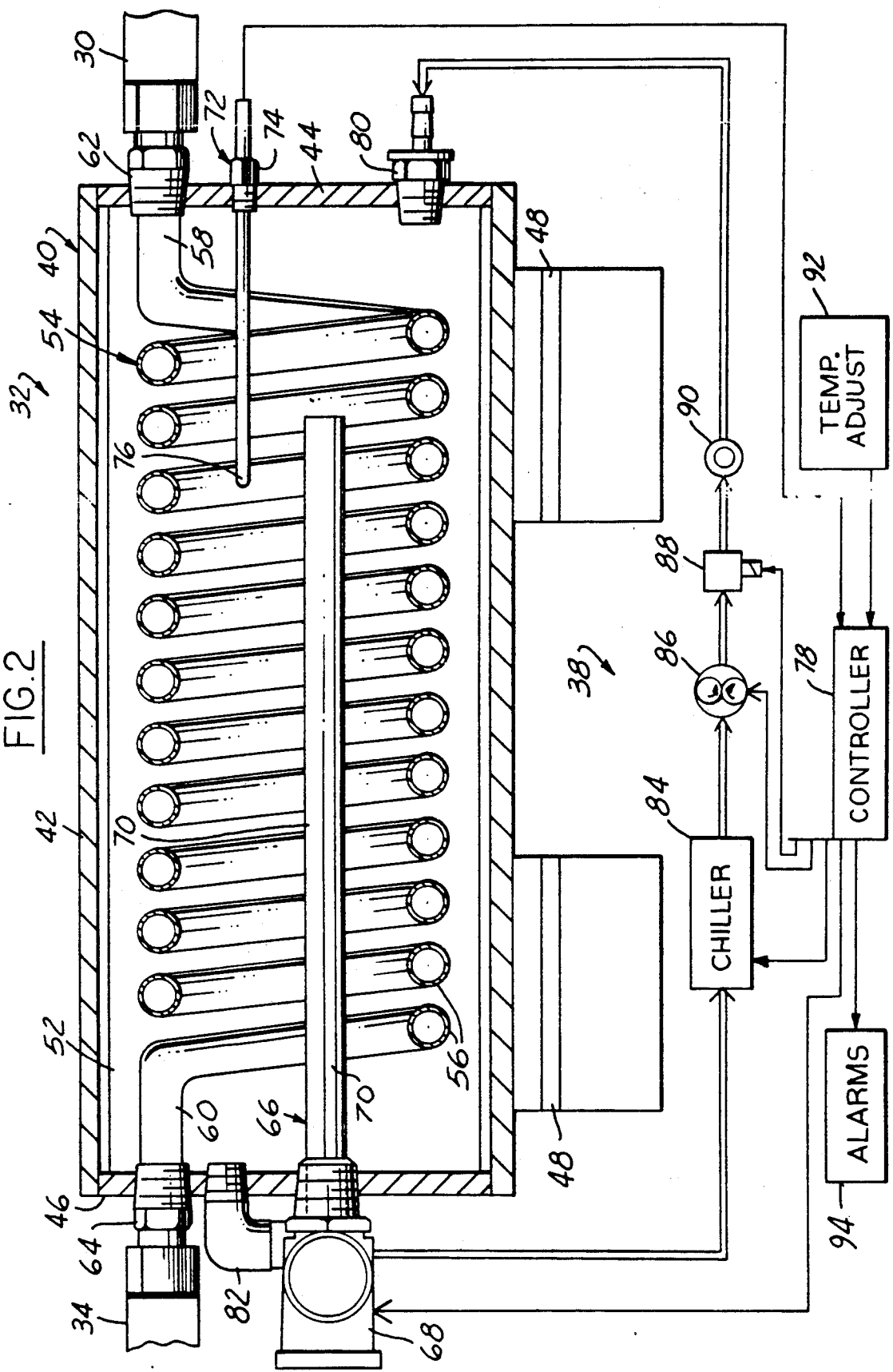
FIG. 2 is a partially schematic and partially fragmented sectional view of the material heating apparatus in FIG. 1.
Figure 3:
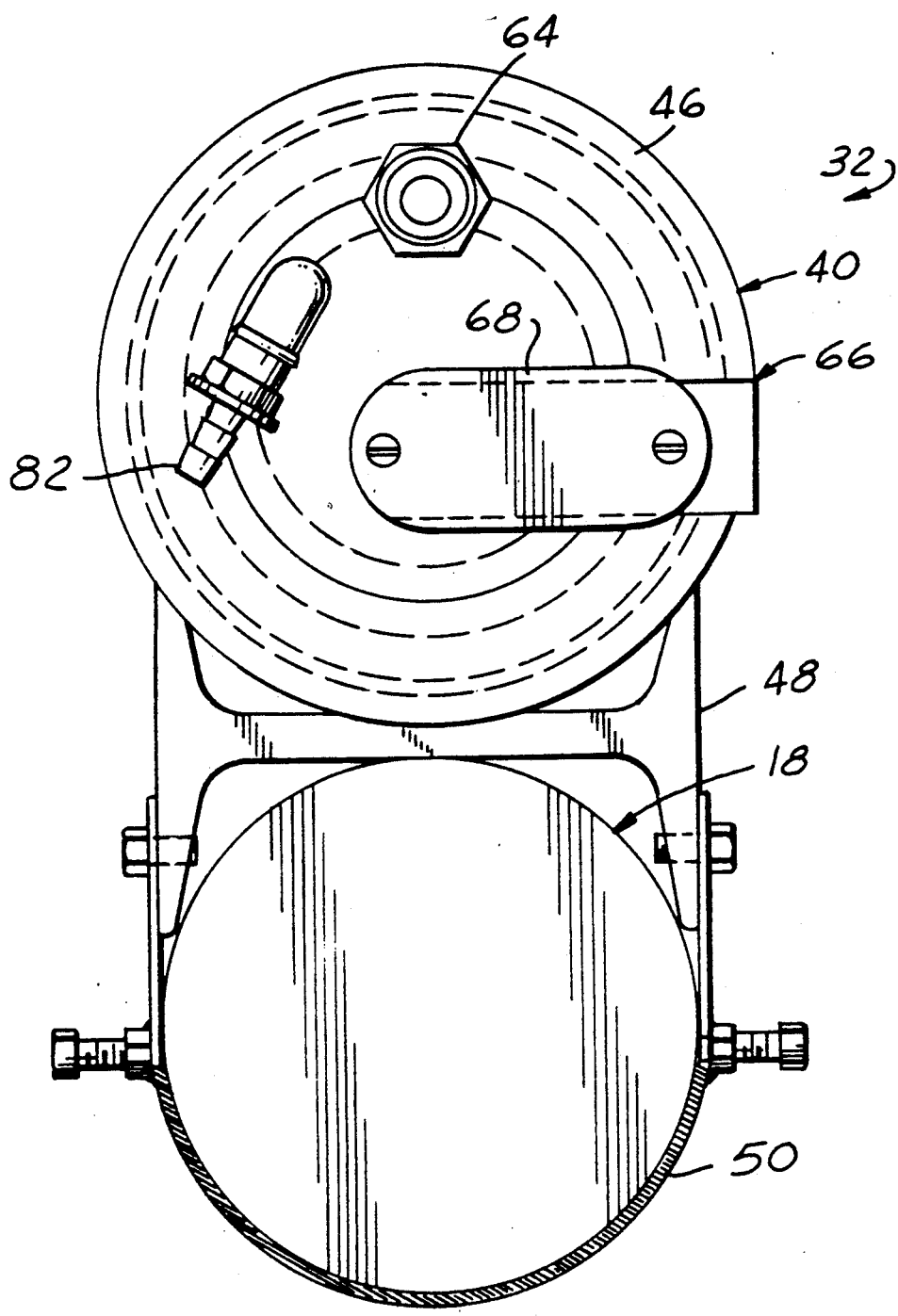
FIG. 3 is an end elevational view of the material heating apparatus illustrated in FIGS. 1 and 2.

Referring to FIGS. 2 and 3, material conditioner 32 comprises a substantially cylindrical hollow enclosure 40 having a sidewall 42 and a pair of axially opposed endwalls 44, 46. A pair of aligned brackets 48 are welded or otherwise affixed at axially spaced positions on enclosure sidewall 42, and a strap 50 is adjustably coupled to each bracket 48 for mounting material conditioner 32 on the arm of robot 18. A spirally-coiled tube 54, of stainless steel tube stock, has a multiplicity of coils 56 at uniform diameter and pitch substantially co-axially disposed within the interior 52 of enclosure 40. Tube 54 is suspended within enclosure 40 by the axially-opposed coil inlet and outlet ends 58, 60. Suitable fittings 62, 64 are carried by endwalls 44, 46 and respectively connect tube ends 58, 60 to conduits 30, 34 (FIGS. 1 and 2). An electric heater 66 has a base 68 approximately centrally mounted on enclosure endwall 46 and a heater element 70 extending therefrom into enclosure interior 52 substantially centrally of coils 56. A temperature sensor 72 has a base 74 substantially centrally mounted on enclosure endwall 44, and has a temperature probe 76 extending into enclosure volume 52 substantially centrally within tube coils 56. Heater 66 and temperature sensor 72 are connected to control electronics 78.

An inlet fitting 80 and an outlet fitting 82 are respectively disposed on endwalls 44, 46 for circulating heat transfer fluid through the hollow interior 52 of enclosure 40. Outlet fitting 82 is connected to inlet fitting 80 by suitable fluid conduits in a closed loop through a chiller 84, a pump 86, a solenoid valve 88 and a flow-indicator 90. Chiller 84 includes a compressor and suitable refrigerant elements for cooling heat transfer fluid passing therethrough. Chiller 84, pump 86 and solenoid valve 88 each receive control inputs from controller 78. Controller 78 also receives an input from a temperature adjustment mechanism 92 for operator selection of temperature within enclosure 40 to which epoxy passing through coil 54 is to be raised, and has an output connected to suitable alarms 94 for indicating over-temperature, under-temperature and other desired alarm conditions. The heat transfer fluid preferably comprises a mixture of glycol and water or other medium required by operating temperature parameters.

In operation, deposition temperature at bead 12 (FIG. 1) is normally specified by a process engineer based upon technical data for the particular material in question, empirical design and operating experience, and other factors. Temperature to which the material is to be raised within conditioner 32 is normally set at adjustment 92 at some slightly higher temperature so as to accommodate heat loss in conduit 34 and extrusion nozzle 36. For example, if a deposition temperature of 100° F. is desired at bead 12, a temperature of 105° F. may be initially set at adjustment 92, and thereafter readjusted upwardly or downwardly depending upon actual measurements, process experience, etc. With the temperature so set, the one-part thermal-cure material, such as structural epoxy, is then propelled through conditioner 32 under pressure from pumps 22. As the material flows through coils 56, heater 66 is operated by controller 78 so as to heat the heat transfer fluid within enclosure 40, with the heat transfer fluid conducting such heat energy to coils 56 and then to the epoxy material. Temperature probe 72 provides electronic signals to controller 78 indicative of heat transfer fluid temperature. Controller 78, which preferably comprises a microprocessor-based controller, contains suitable programming for operating chiller 84, pump 86, solenoid valve 88 and heater 66 to maintain the heat transfer fluid within enclosure 40 surrounding coils 54 at the desired operating temperature.

In accordance with the an important advantage of the present invention, coiled tubing 54 inherently automatically folds the epoxy material on itself during passage therethrough, which helps enhance heat distribution throughout the material without imparting shear stresses to the material that might undesirably activate material thixotropes. Such uniform heat distribution without shear is thus important in obtaining and maintaining desired properties in the epoxy material Length of coiled tubing 54 within enclosure 40 is selected to provide sufficient material residence time within conditioner 32 for uniform heating and temperature increase, given the material flow rate prespecified by the process engineer. It has been empirically determined in development of the present invention that an optimum material residence time within conditioner 32 is equal to approximately 3.2 times material flow rate in hours. For example, if flow rate is specified at twenty-five cubic inches per hour, length and internal diameter of coil 54 are selected to hold eighty cubic inches of epoxy. Coil pitch is selected as a balance between back pressure of fluid resulting from reduced pitch and increased axial length of enclosure 40 necessitated by greater pitch.

The invention claimed is:

1. A system for applying a fluent one-part thermal-cure material at predetermined constant flow rate to a substrate in which the system includes means for supplying the material under pressure at said predetermined constant flow rate, means for heating the material to a predetermined elevated temperature above ambient, means for applying the material at said elevated temperature to a substrate, and conduit means for feeding the material from said supplying means to said heating means and thence to said applying means, characterized in that said means for heating the material comprises:
   a hollow enclosure having an internal volume, a spirally coiled tube suspended within said enclosure and having first and second tube ends coupled to said conduit means, said coiled tube having a diameter and length coordinated with said predetermined constant flow rate of material through said heating means and with said predetermined temperature to provide a predetermined fixed residence time of material in said heating means at said predetermined constant material flow rate such that material exiting said heating means is at said predetermined temperature, a heater positioned within said enclosure and having means responsive to application of electrical power for heating said volume, temperature sensing means positioned within said volume for supplying electronic signals as a function of temperature thereof, and electronic control means including means responsive to said electronic signals for selectively applying electrical power to said heater to maintain temperature within said volume at said elevated temperature.

2. The system set forth in claim 1 wherein said supplying means comprising a piston pump.

3. The system of claim 1, wherein said one-part thermal cure material is structural epoxy.

4. A system for applying a fluent thermal-cure material to a substrate that includes means for supplying the material under pressure, means for heating the material to an elevated temperature above ambient, means for applying the material at said elevated temperature to a substrate, and conduit means for feeding the material from said supplying means to said heating means and thence to said applying means, characterized in that said heating means comprises:
   a hollow enclosure,
   a spirally coiled tube mounted within said enclosure, and having first and second tube ends coupled by said conduit means to said supplying means and said applying means,
   heat transfer means including a heat transfer fluid, pumping means responsive to a first electrical signal for circulating said heat transfer fluid in a closed path through said enclosure, and means within said enclosure for bringing said heat transfer fluid into heat-transfer relation to material in said tube,
   heating means responsive to a second electrical signal for selectively heating said heat transfer fluid,
   cooling means responsive to a third electrical signal for selectively cooling said heat transfer fluid,
   temperature sensing means for supplying a fourth electrical signal as a function of temperature of the material,
   means responsive to an operator for supplying a fifth electrical signal as a function of desired temperature of material at said applying means, and
   electronic control means responsive to said fourth and fifth electrical signals from said temperature sensing means and said operator-responsive means for selectively supplying said first, second and third electrical signals to said pumping means, said heating means and said cooling means for raising and holding temperature of the material to said desired temperature.

5. The system set forth in claim 4 wherein said coiled tube comprises coils of uniform diameter and pitch.

6. The system set forth in claim 4 for applying the material at predetermined constant flow rate, said supplying means including a pump for supplying the material at said predetermined constant flow rate, and wherein said coiled tube has a diameter and length selected to provide a predetermined residence time of material in said heating means at said predetermined flow rate.

7. The system set forth in claim 6 wherein said pump comprises a piston pump.

8. The system set forth in claim 4 wherein said heat transfer fluid comprises a mixture of glycol and water.

9. The system set forth in claim 4 wherein said heating means is positioned within said enclosure.

10. The system set forth in claim 4 wherein said temperature sensing means is positioned within said enclosure.

11. The system set forth in claim 4 wherein said enclosure has an open internal volume, and wherein said heat transfer means substantially fills said volume in heat transfer contact with an external surface of said tube.

* * * * *